United States Patent
Shaw

(10) Patent No.: US 8,224,296 B2
(45) Date of Patent: Jul. 17, 2012

(54) VISUAL VOICEMAIL DETECTION AND MANAGEMENT SYSTEM

(75) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 220 days.

(21) Appl. No.: 12/638,936

(22) Filed: Dec. 15, 2009

(65) Prior Publication Data

US 2011/0143725 A1 Jun. 16, 2011

(51) Int. Cl.
*H04M 11/10* (2006.01)
(52) U.S. Cl. .................. 455/413; 455/412.1; 455/412.2
(58) Field of Classification Search .................. None
See application file for complete search history.

(56) References Cited

U.S. PATENT DOCUMENTS

| 2009/0156176 A1* | 6/2009 | Hao et al. ...................... 455/413 |
| 2010/0159888 A1* | 6/2010 | Sigmund et al. .............. 455/413 |
| 2010/0167700 A1* | 7/2010 | Brock et al. .................. 455/413 |
| 2011/0143718 A1* | 6/2011 | Engelhart, Sr. ............ 455/412.1 |

\* cited by examiner

*Primary Examiner* — Erika Gary
(74) *Attorney, Agent, or Firm* — Woodcock Washburn LLP

(57) ABSTRACT

A visual voicemail message may be generated and/or rendered and provided to a mobile device in a format determined based on a characteristic. For example, an identifier of a mobile device may be received. Upon receipt of the mobile device identifier, a characteristic such as a type, a brand, a model, a firmware version, or the like that may indicate a particular format and/or message type capable of being received and/or displayed by the mobile device may be determined. A visual voicemail message may then be generated and/or rendered in the particular format and provided to the mobile device.

13 Claims, 6 Drawing Sheets

VISUAL VOICEMAIL DETECTION AND MANAGEMENT SYSTEM

BACKGROUND

Today, mobile devices are capable of receiving and providing visual voicemail messages to subscribers or users thereof. For example, the mobile devices can receive voicemail messages and display the messages with a visual aspect such as in a list, with textual transcription, or the like. Typically, the mobile devices capable of receiving visual voicemail messages have a visual voicemail client operating thereon that can be used to display the visual aspects of the voicemail messages. Unfortunately, such visual voicemail clients are currently supported on a limited number of mobile devices.

SUMMARY

Disclosed herein are systems and methods for providing a visual voicemail message to a mobile device associated with an intended recipient of a voicemail. For example, in one embodiment, an identifier of the mobile device associated with the intended recipient and a voicemail message for the intended recipient may be received by, for example, a visual voicemail system. The visual voicemail system may then determine a characteristic such as a type, brand, model, firmware version, or the like of the mobile device. According to one embodiment, the characteristic may indicate a message type or format that may be received and/or displayed by the mobile device. Based on the characteristic, the visual voicemail system may then generate and/or render a visual voicemail message for the received voicemail in a format suitable for receipt and/or display by the mobile device. In example embodiments, the visual voicemail system may generate and/or render the visual voicemail message in an IMAP-4 format, HTTP format, MM1 format, SMPP format, SMTP format, or any other suitable format depending on the characteristic determined for the mobile device. The visual voicemail system may then provide the formatted visual voicemail message to the mobile device such that the mobile device may receive and/or display the visual voicemail message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

As will be described herein, a visual voicemail system may format a visual voicemail message according to a message type or format capable of being received and/or displayed on a mobile device associated with an intended recipient. In one embodiment, upon receipt of an identifier from a mobile device, the visual voicemail system may determine a characteristic such as a type, a brand, a model, a firmware version, or the like of the mobile device associated with an intended recipient or subscriber of a voicemail. According to an example embodiment, the characteristic may be indicative of a message type and/or format capable of being received and/or displayed on a mobile device. For example, the visual voicemail system may determine whether the mobile device associated with the intended recipient may be capable of receiving and/or displaying messages in an IMAP-4 format, a HTTP format, a MM1 format, a SMPP format, a SMTP format, or the like based on the characteristic. The visual voicemail system may then generate and/or render a visual voicemail message in the appropriate format and provide the formatted visual voicemail message to the mobile device such that the mobile device may display the visual voicemail message to the intended recipient or subscriber.

Figure 1:
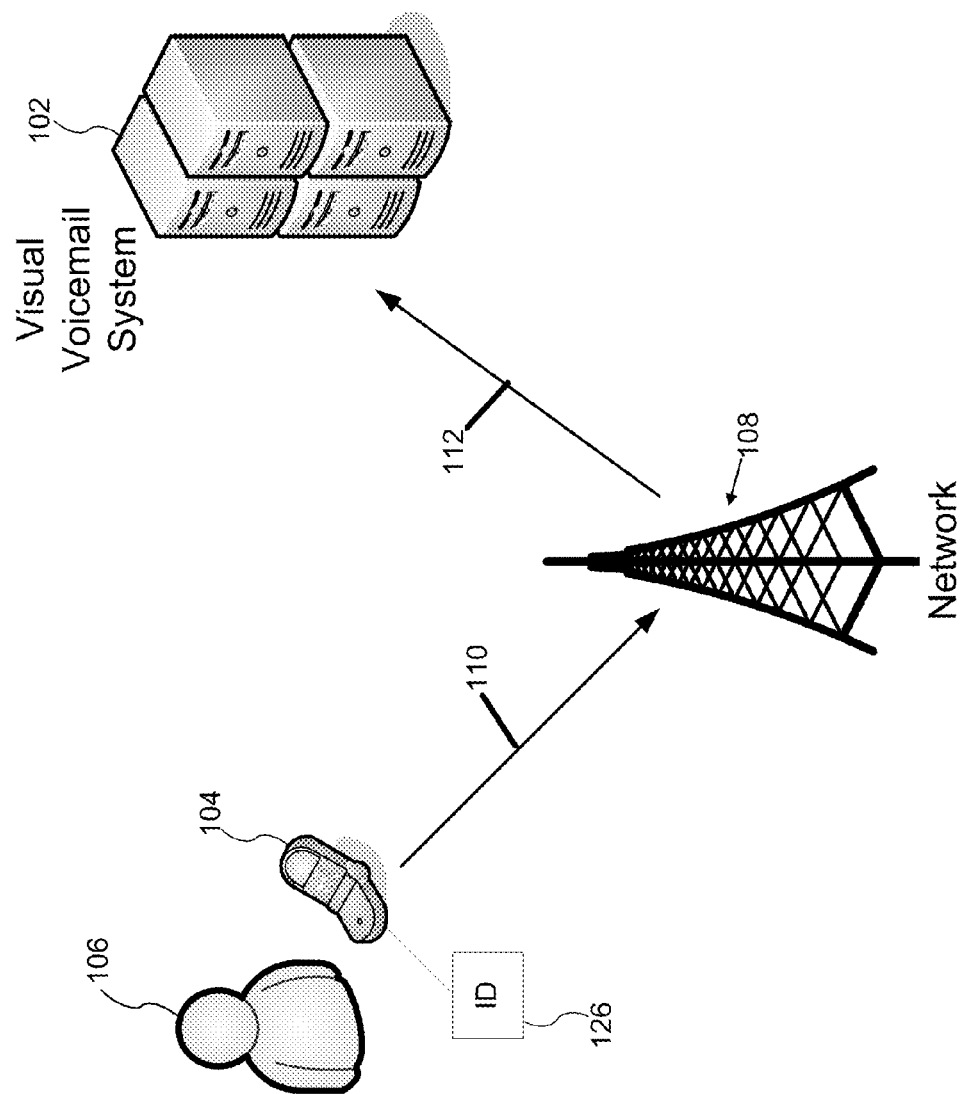
FIG. 1 depicts an example configuration of a mobile device in communication with a network and visual voicemail system.

FIG. 1 depicts an example system and process for providing an identifier of a mobile device to a visual voicemail system. As shown in FIG. 1, in one embodiment, a mobile device 104 may have an identifier 126 associated therewith. The identifier 126 may include one or more numbers, characters, or the like that may be unique to the mobile device 104 and/or a subscriber of the mobile device 104. For example, according to one embodiment, the identifier 126 may be an International Mobile Equipment Identity ("IMEI") number, a Subscriber Identity Module (SIM) number stored on, for example, a SIM card, or the like.

As shown in FIG. 1, the mobile device 104 may be in communication with a network 108. The network 108 may be a part of any type of communication network such as the internet, a Local Area Network (LAN), a Wide Area Network (WAN), a cellular telephone network, or the like. For example, the network 108 may include the example networks described below with respect to FIGS. 4-6 such as Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HSPDA"), cdma2000 1x. Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like.

According to an example embodiment, a communication link may be established between the mobile device 104 and the network 108 such that the mobile device 104 may provide the identifier 126 to the network 108 at 110 via the communication link. For example, the mobile device 104 may request PDP activation with the network 108 via the communication link. In one embodiment, the PDP activation may be requested in response to receiving a notification that a voicemail message intended for the recipient or subscriber operating the mobile device 104 has been received. During the PDP activation, the mobile device 104 may provide the identifier 126 to the network 108 at 110. The network 108 may then store the identifier 126, provide the identifier 126 to a visual voicemail system 102 at 112, process the identifier 126 to determine a characteristic of the mobile device 104, provide a characteristic of the mobile device 104 to the visual voicemail system 102 at 112, or perform any other suitable function associated with the identifier 126.

According to one embodiment, the visual voicemail system 102 may receive the identifier 126 provided by the mobile device 104 from the network 108 at 112. For example, the visual voicemail system 102 may send a device capability request to the network 108. Upon receiving the device capability request, the network 108 may provide the identifier 126 received from the mobile device 104 at 110 to the visual voicemail system request at 112.

According to another embodiment, the visual voicemail system 102 may receive the identifier 126 directly from the mobile device 104. For example, a direct communication link such as a two-way communication link may be established between the mobile device 104 and the visual voicemail system 102. In one embodiment, the visual voicemail system 102 may send a device capability request to the mobile device 104 via the direct communication link such that the mobile device 104 may respond to the request by providing the identifier 126 to the visual voicemail system 102.

The visual voicemail system 102 may then determine a characteristic of the mobile device 104 using the identifier 126, format a visual voicemail message capable of being received and/or displayed by the mobile device 104 based on the characteristic, and/or provide the formatted visual voicemail message to the mobile device 104, which will be described in more detail below.

Figure 2:
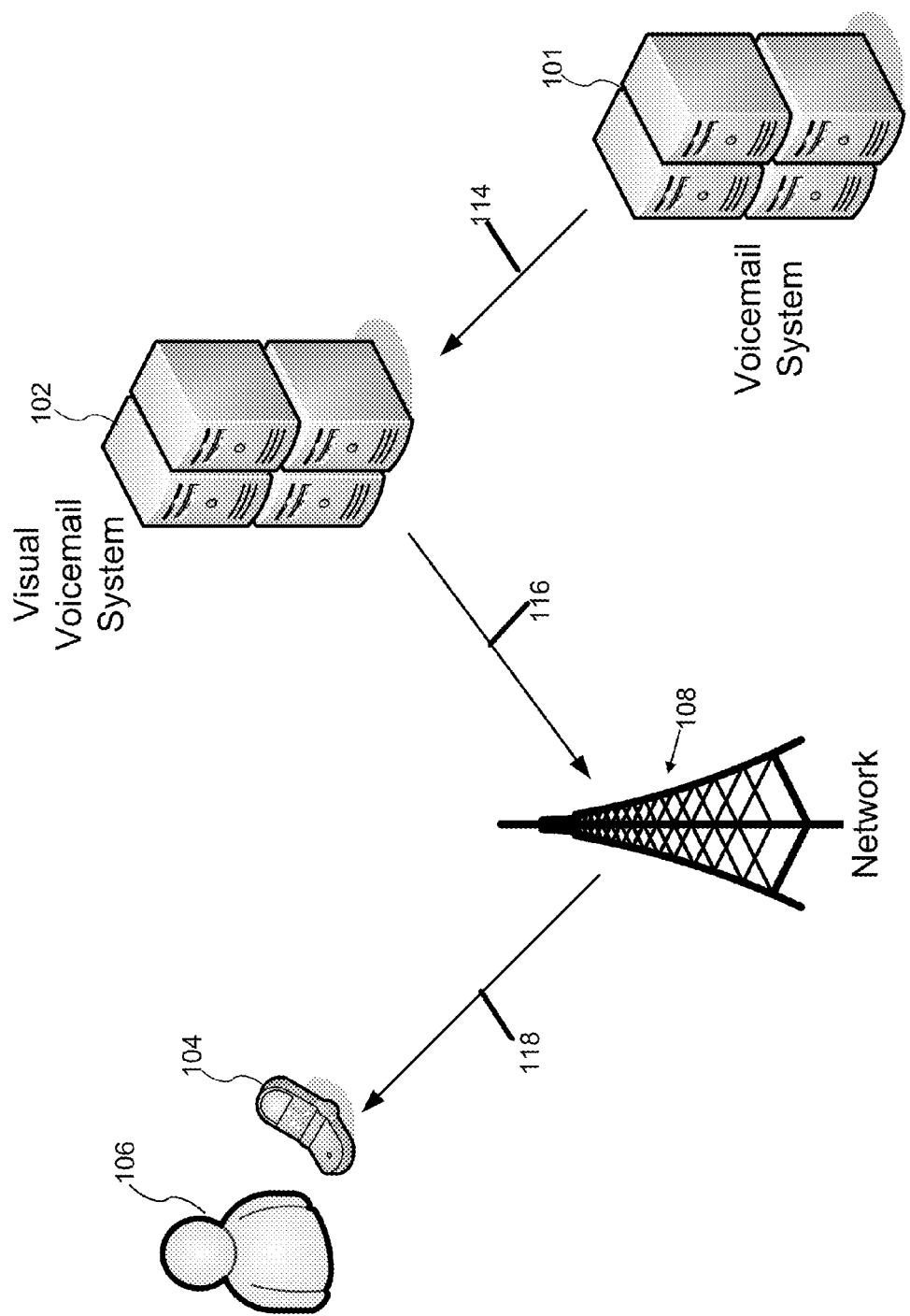
FIG. 2 depicts an example configuration of a visual voicemail system in communication with a network, a mobile device, and a voicemail system.

FIG. 2 depicts an example system and an example process for formatting and providing a visual voicemail message to a mobile device. As shown in FIG. 2, the visual voicemail system 102 may be in communication with a voicemail system such that the voicemail system 101 may provide a voicemail message such as an audio message intended for the recipient or subscriber of the mobile device 104 to the visual voicemail system 102 at 114. According to an example embodiment, the voicemail system 101 may be a centralized system such as a server, a computer, or the like that may manage and/or store the voicemail messages for a large group of intended recipients or subscribers operating mobile devices such as the mobile device 104 on the network 108. For example, a calling party may place a telephone call via a telecommunication device to a call recipient. If the call recipient does not answer the telephone call, the calling party may record a voicemail message such as an audio message for the call recipient that may be rendered and stored in the voicemail system 101. The voicemail system 101 may then provide the voicemail message to the visual voicemail system 102 at 114.

According to an example embodiment, the visual voicemail system 102 may receive a voicemail message from, for example, a voicemail system such as the voicemail system 101 at 114. The visual voicemail system 102 may then render and/or generate a visual voicemail message that may have a visual aspect such as textual transcription, a graphical depiction, a list, or the like in addition to the voicemail message.

According to an example embodiment, the visual voicemail system 102 may render and/or generate the visual voicemail message in a format capable of being received and/or displayed by the mobile device such as the mobile device 104 associated with the intended recipient of the voicemail. For example, the visual voicemail system 102 may include a database that may have characteristics such as a type, a brand, a model, a firmware version, or the like stored therein that may indicate a message type and/or format capable of being received by a mobile device associated with an intended recipient of a voicemail message. In one embodiment, each characteristic stored in the database may be indexed or associated with a particular identifier of a mobile device that may operate on the network 108 and/or may access the visual voicemail system 102.

The visual voicemail system 102 may use the database to determine a particular characteristic of a mobile device associated with an intended recipient of a received voicemail such that a visual voicemail message may be formatted therefore. For example, to determine a characteristic of the mobile device 104, the visual voicemail system 102 may query the database using the identifier 126 received from the network 108 at 112 and/or directly from the mobile device 104 as described above with respect to FIG. 1. To query the database, the visual voicemail system 102 may compare the identifier 126 with the identifiers associated with the characteristics stored in the database. Based on the comparison, if the identifier 126 matches one of the identifiers associated with the characteristics stored in the database, the visual voicemail system 102 may access the characteristic.

The visual voicemail system 102 may then format the visual voicemail message based on the characteristic. For example, the visual voicemail system 102 may have a format or message type such an IMAP-4 format, HTTP format, MM1 format, SMPP format, SMTP format, or the like associated with each of the characteristics stored in the database. When the visual voicemail system 102 accesses the determined characteristic, the visual voicemail system 102 may further access the format and/or message type associated with the determined characteristic. According to one embodiment, the visual voicemail system 102 may then render and/or generate a visual voicemail message for the mobile device 104 in the format or message type associated with the characteristic. For example, the characteristic determined for the identifier 126 of the mobile device 104 may indicate that the mobile device 104 may be capable of receiving and/or displaying a message in an MMS format. The visual voicemail system 102 may then render and/or generate a visual voicemail message in the MMS format.

Thus, in one embodiment, the visual voicemail system 102 may determine a characteristic of a mobile device associated with an intended recipient of a voicemail. The characteristic may indicate or have associated therewith the format and/or message type as described above. The visual voicemail system 102 may render and/or generate a visual voicemail message based on the characteristic such that a visual aspect may be added to a voicemail message in the format and/or message type associated with the characteristic.

According to example embodiments, the visual voicemail system 102 may include any combination of hardware components such as processors, databases, storage drives, registers, cache, RAM memory chips, data buses, or the like and/or software components such as operating systems, database management applications, or the like. In one embodiment, the visual voicemail system 102 may include a processor and a memory component such as flash memory, cache, RAM memory chips, ROM memory chips, or the like. The memory component may be a storage medium that may have stored therein instructions that may be executed by the processor to receive a voicemail from the voicemail system 101, determine a characteristic of a mobile device such as the mobile device 104 associated with an intended recipient of the voicemail, format and/or render a visual voicemail message based on the characteristic of the mobile device associated with the recipient of the voicemail, provide the visual voicemail message to the mobile device, or any other suitable instruction that may process a voicemail and generate a visual voicemail message for the voicemail message based on a device characteristic.

The visual voicemail system 102 may also include a networking component such as a network interface card, a network adapter, a network interface controller (NIC), a LAN adapter, or the like. According to an example embodiment, the networking component may enable the visual voicemail system 102 to communicate with, for example, the voicemail system 101, the mobile device 104, and/or the network 108. For example, the networking component may establish a communication link between the visual voicemail system 102 and the voicemail server 101 such that the visual voicemail system may receive a voicemail message from the voicemail system 101 at 114. The networking component may also establish a communication link between the visual voicemail system 102 and the network 108 such that the visual voicemail system may provide a formatted visual voicemail message to the network 108 at 116, which will be described in more detail below.

In one embodiment, after formatting the visual voicemail message, the visual voicemail message may be provided to the network 108 at 116. The visual voicemail message may then be provided to the mobile device 104 associated with the intended recipient at 118. The mobile device 104 may be representative of any appropriate type of device that may be utilized, for example, to receive a visual voicemail message. For example, the mobile device 104 may be a portable computing device, such as a laptop, a personal digital assistant ("PDA"), a portable phone, such as a cell phone or the like, a smart phone, a Session Initiation Protocol (SIP) phone, a video phone, a portable email device, a thin client, or the like. The mobile device 104 may include hardware components such as a processor, a graphics card, a storage component, a memory component, an antenna, a communication component, an interface component such as a speaker, a display, a keypad, a microphone, or the like. The mobile device 104 may also include software components such as an operating system that may control the hardware and a messaging client for receiving and/or displaying visual voicemail messages.

According to one embodiment, the mobile device 104 may include a display component, a messaging client component, a processor, and/or a memory component. According to one embodiment, the processor may include any appropriate type of processor such as a single processor, multiple processors that may be distributed or centrally located, or the like. For example, the processor may be a mobile communication device processor, a computer processor, a handheld processor, or the like. The processor may include any other suitable hardware such as cache, Random Access Memory, storage devices, or the like and/or software. According to an example embodiment, the processor may receive a formatted visual voicemail message from the network 108 at 118. Alternatively, the processor may receive a formatted visual voicemail message directly from the visual voicemail system 102 via a direct communication link such as a 2-way communication link. The processor may further execute instructions associated with a messaging application such that the messaging client component may output the visual voicemail messages to the recipient via the display component.

According to one embodiment, the processor may interact with the memory component in the mobile device 104. The memory component may include a flash memory, cache, RAM memory chips, ROM memory chips, or the like. Thus, according to an example embodiment, the processor may access information and/or instructions stored in the memory component to, for example, activate the mobile device 104 to receive a visual voicemail message from the network 108 and/or execute a messaging client component to output the visual voicemail message to the intended recipient via the display component.

For example, the messaging client component on the mobile device 104 may interact with processor and the memory component. According to one embodiment, the messaging client component may be a mobile client application executed by the processor that may be capable of receiving the visual voicemail message in the particular format and displaying the visual voicemail message to the intended recipient. For example, the messaging client component may be a visual voicemail client, an MMS client, an SMS client, an email client, or the like capable of receiving and/or displaying aspects of a visual voicemail message in the a particular format such as an IMAP-4 format, a HTTP format, a MM1 format, a SMPP format, a SMTP format or the like. According to example embodiments, the messaging client component may display the aspects of the visual voicemail messages as an audio attachment, a URL, a text message, a multimedia message, an audio attachment, an email, or the like.

Figure 3:
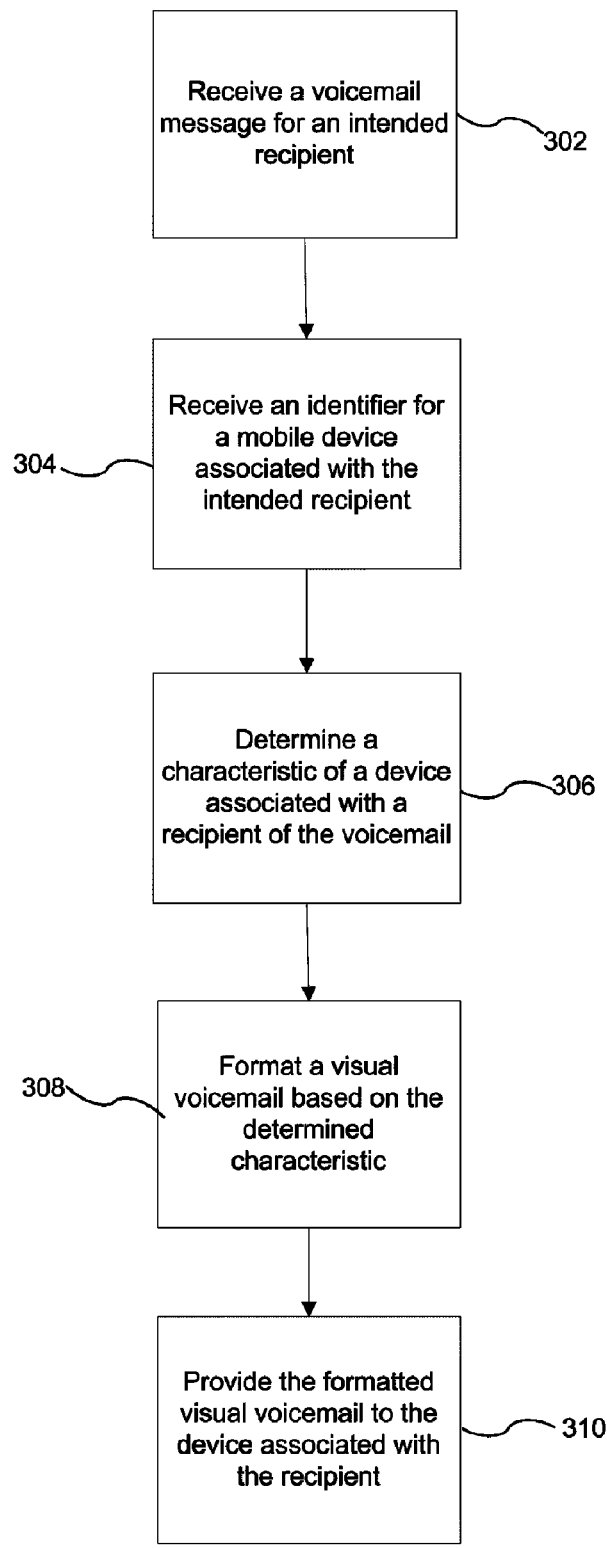
FIG. 3 depicts a flow diagram of an example embodiment of a method for providing a visual voicemail message to a mobile device.

FIG. 3 depicts a flow diagram of an example embodiment of a method for providing a visual voicemail message to a mobile device. At 302, a visual voicemail system such as visual voicemail system 102 may receive an incoming voicemail message from a voicemail source such as the voicemail system 101.

The visual voicemail system may also receive an identifier such as the identifier 126 for a device such as the mobile device associated with an intended recipient of the incoming voicemail at 304. The identifier may include an unique mobile device identification that may include one or more numbers, characters, or the like that may be unique to the mobile device such as an IMEI identifier, a Subscriber Identity Module (SIM) identifier stored on, for example, a SIM card, or the like.

The visual voicemail system may determine a characteristic such as a type, brand, model, firmware version, or the like of the mobile device at 306 based on the identifier. To determine the characteristic at 306, the visual voicemail system may query a database such as an IMEI database, or the like for the identifier and corresponding characteristic information.

After determining the mobile device characteristic at 306, the visual voicemail system may format the visual voicemail message at 308 according to or based on the characteristic determined at 306. For example, the visual voicemail system may determine at 306 that the mobile device may be of a particular type capable of receiving messages in a particular format such as an IMAP-4 format, a HTTP format, a MM1 format, a SMPP format, a SMTP format or the like. The visual voicemail system may then render and/or generate a visual voicemail message in the particular format.

After formatting the visual voicemail message at 308, the visual voicemail system may provide the formatted visual voicemail message to the mobile device at 310. The mobile device may then display the visual voicemail such that the intended recipient may interact with the mobile device to view the visual aspects of the visual voicemail message, listen to audio associated with the visual voicemail message, or the like.

Figure 4:
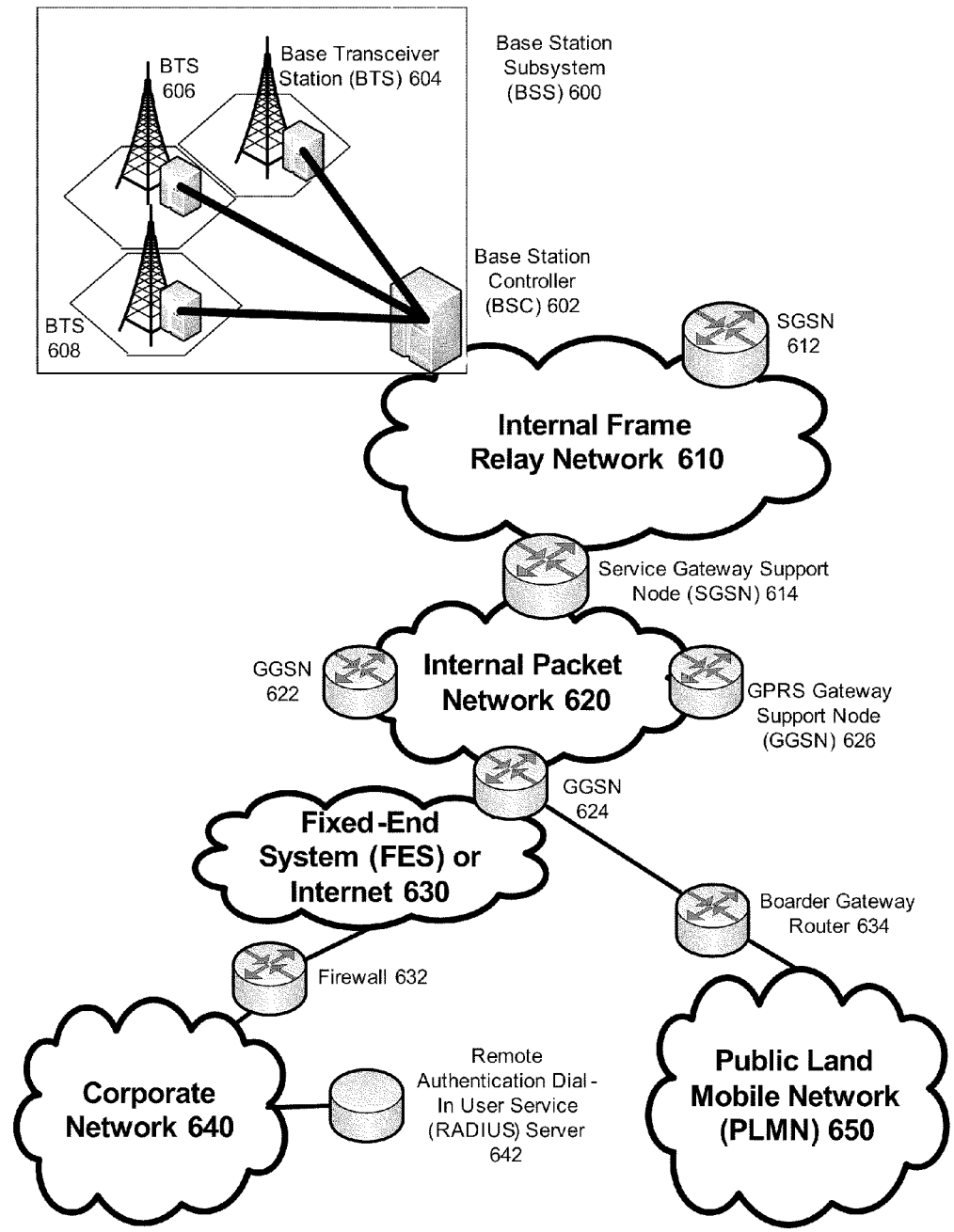
FIG. 4 depicts an overall block diagram of an exemplary packet-based mobile cellular network environment, such as a GPRS network, that may be used to provide a visual voicemail message to a mobile device.

FIG. 4 depicts an overall block diagram of an exemplary packet-based mobile cellular network environment, such as a GPRS network, that may be used to provide a visual voicemail message to a mobile device. In an example configuration, the network 108 may be encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that may include Service GPRS Support Nodes ("SGSN") such as SGSN 612 and 614. Each SGSN is connected to an internal packet network 620 through which a SGSN 612, 614, etc. may route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
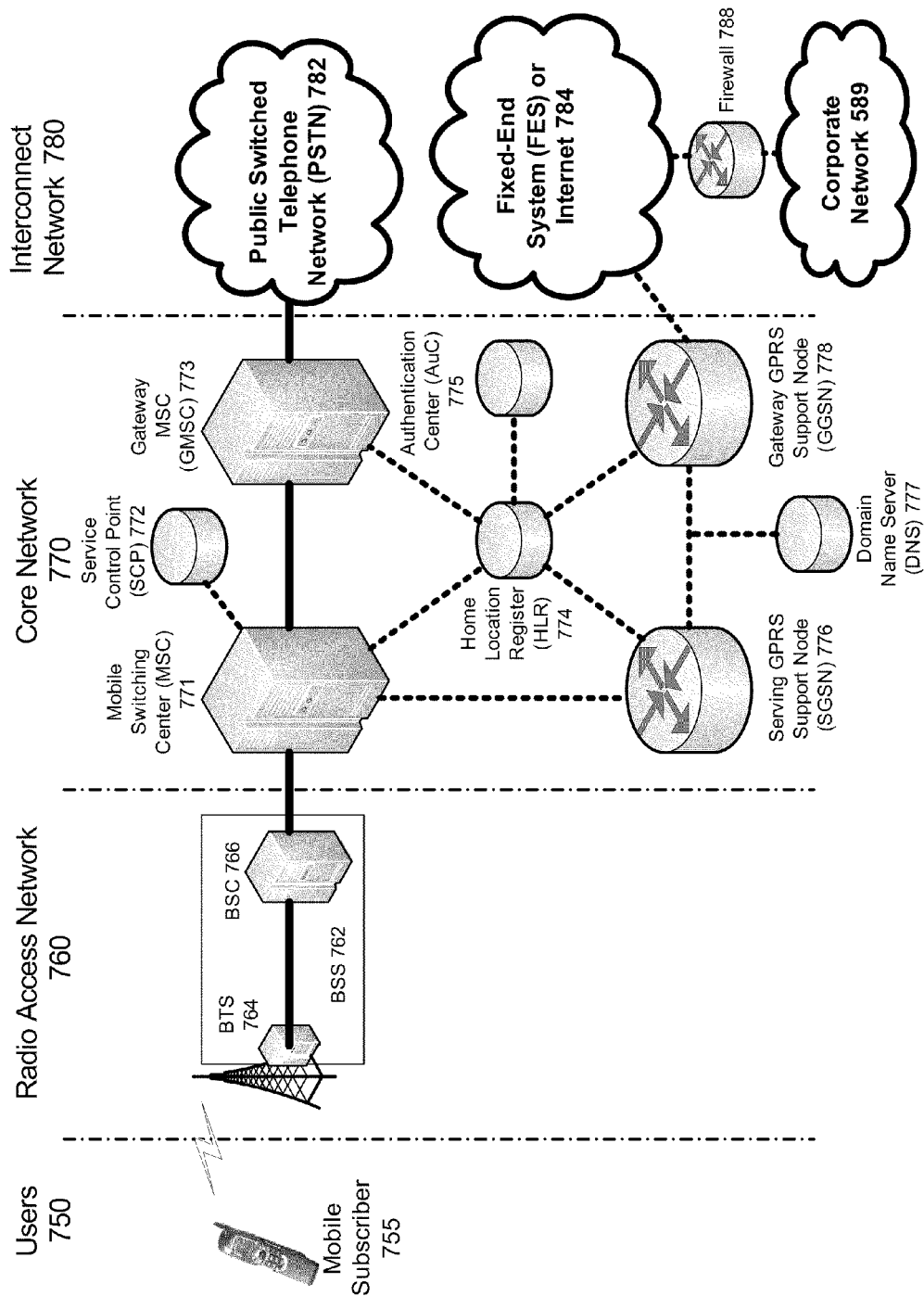
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the network 108 is encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 104, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which may be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 may access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 may then go through radio access network 760, core network 770, and interconnect network 780, in a particular fixed-end system or Internet 784 and firewall 788, to reach corporate network 789.

Thus, network elements that may invoke the functionality of a configuration based visual voicemail message may include but are not limited to Gateway GPRS Support Node tables, Fixed End System router tables, firewall systems, VPN tunnels, and any number of other network elements as required by the particular digital network.

Figure 6:
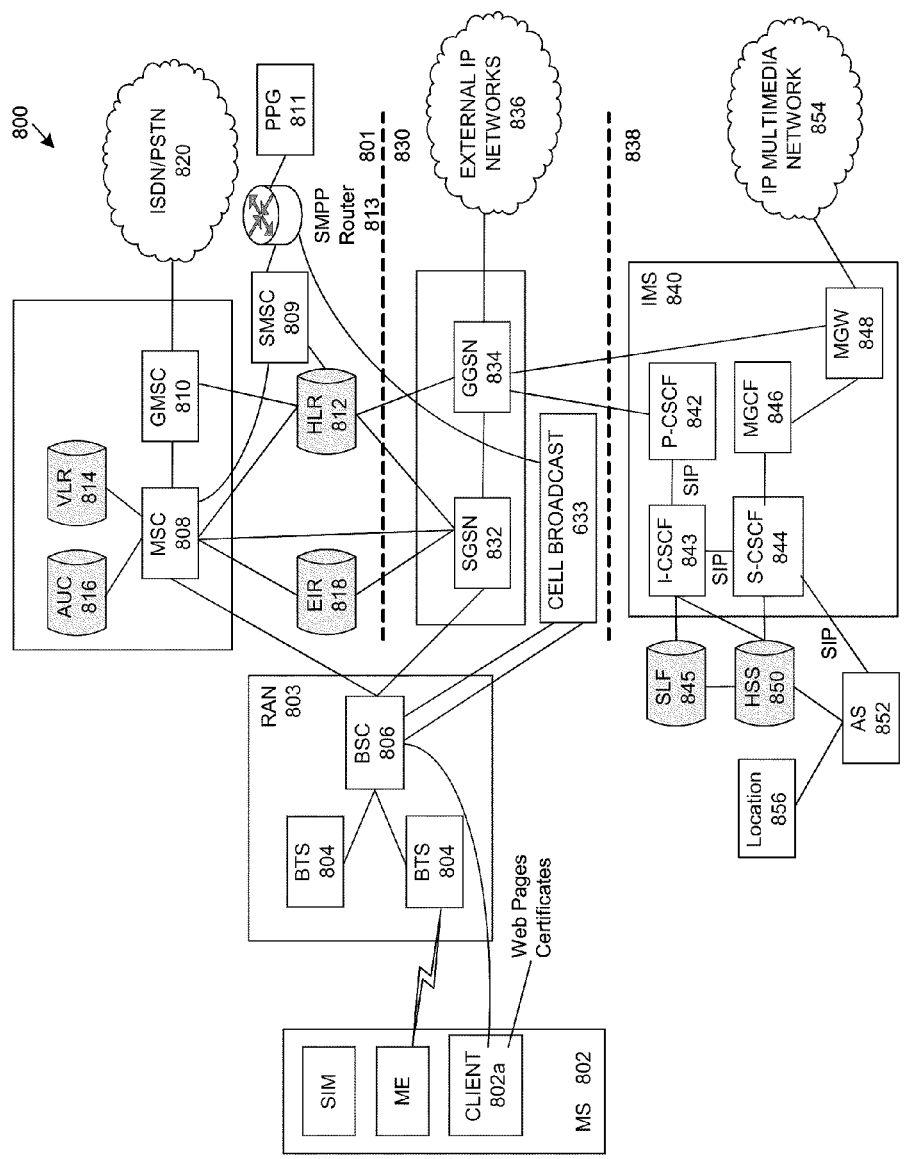
FIG. 6 illustrates an example alternate block diagram of an exemplary GSM/GPRS/IP multimedia network architecture that may be used to provide a visual voicemail message to a mobile device.

FIG. 6 illustrates another exemplary block diagram view of a GSM/GPRS/IP multimedia network architecture 800 that may be used to provide a visual voicemail message to a mobile device. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS also supports simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services is not possible with a class C MS.

A GPRS network 830 may be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of providing a visual voicemail message to a mobile device have been described in connection with various computing devices, the underlying concepts may be applied to any computing device or system capable of activating and/or updating a mobile device to provide a visual voicemail message. The various techniques described herein may be implemented in connection with hardware or software or, where appropriate, with a combination of both. Thus, the methods and apparatus of activating and/or updating a mobile device to receive a visual voicemail message, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer. In the case of program code execution on programmable computers, the computing device may include a processor, a storage medium readable by the processor (including volatile and non-volatile memory and/or storage elements), at least one input device, and at least one output device. The program(s) may be implemented in assembly or machine language, if desired. In any case, the language may be a compiled or interpreted language, and combined with hardware implementations.

The methods and apparatus for providing a visual voicemail message to a mobile device also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, such that the machine may become an apparatus for activating and/or updating a mobile device to receive a voicemail message. When implemented on a general-purpose processor, the program code may combine with the processor to provide a unique apparatus that may operate to invoke the functionality of activating and/or updating a mobile device to receive a visual voicemail message. Additionally, any storage techniques used in connection with activating and/or updating a mobile device to receive a visual voicemail message may invariably be a combination of hardware and software.

While providing a visual voicemail message to a mobile device has been described in connection with the various embodiments of the various figures, it is to be understood that other similar embodiments may be used or modifications and additions may be made to the described embodiment for performing the same functions described herein. For example, one skilled in the art will recognize that a system for activating and/or updating a mobile device to receive a visual voicemail message as described may apply to any environment, whether wired or wireless, and may be applied to any number of devices connected via a communications network and interacting across the network.

What is claimed:

1. A computer implemented method comprising:
   receiving a voicemail;
   determining a characteristic of a mobile device associated with an intended recipient of the voicemail based on an identifier of the mobile device comprising at least one of a SIM card identification number or an IMEI identification number;
   formatting a visual voicemail message, in accordance with an HTTP format, based on the characteristic of the mobile device; and
   providing the formatted visual voicemail message to the mobile device.

2. The computer implemented method of claim 1, wherein receiving a voicemail comprises receiving an audio voicemail.

3. The computer implemented method of claim 2, further comprising converting the audio voicemail to the visual voicemail message.

4. The computer implemented method of claim 3, wherein converting the audio voicemail to the visual voicemail message comprises converting the audio voicemail to a textual transcription.

5. The computer implemented method of claim 3, wherein converting the audio voicemail to the visual voicemail message comprises converting the audio voicemail to a graphical depiction.

6. A system comprising:
   a storage area for program code and data; and
   a processor for executing the program code, wherein execution of the program code directs the system to:
   receive a voicemail;
   determine a characteristic of a mobile device based on an identifier received from the mobile device, the identifier comprising at least one of a SIM card identification number or an IMEI identification number;
   format a visual voicemail message in a format suitable for the mobile device based on the characteristic, the format comprising an HTTP format; and
   provide the visual voicemail message to the mobile device.

7. The system of claim 6, wherein execution of the program code further directs the system to convert the voicemail from an audio format to the visual voicemail message.

8. The system of claim 6, wherein the visual voicemail message comprises a textual transcription.

9. The system of claim 6, wherein the visual voicemail message comprises a graphical depiction.

10. A computer-readable storage medium having stored thereon computer executable instructions, wherein the computer-readable storage medium is not a transient signal, the computer executable instructions comprising instructions for:
    receiving a voicemail;
    determining a characteristic of a mobile device associated with a recipient of the voicemail, wherein:
    the characteristic indicates a format capable of being received by the of the mobile device, the format comprising an HTTP format;
    the characteristic is determined based on an identifier of the mobile device comprising at least one of a SIM card identification number or an IMEI identification number;
    generating a visual voicemail message in the format associated with the characteristic; and
    providing the visual voicemail message to the mobile device.

11. The computer-readable storage medium of claim 10, wherein the computer executable instructions further comprise instructions for converting the voicemail from an audio format to the visual voicemail message.

12. The computer-readable storage medium of claim 10, wherein the visual voicemail message comprises a textual transcription.

13. The computer-readable storage medium of claim 10, wherein the visual voicemail message comprises a graphical depiction.

* * * * *

UNITED STATES PATENT AND TRADEMARK OFFICE
CERTIFICATE OF CORRECTION

| | | |
|---|---|---|
| PATENT NO. | : 8,224,296 B2 | |
| APPLICATION NO. | : 12/638936 | |
| DATED | : July 17, 2012 | |
| INVENTOR(S) | : Venson M. Shaw | |

It is certified that error appears in the above-identified patent and that said Letters Patent is hereby corrected as shown below:

In the Claims:

Column 14,

Line 21, delete "by the of the mobile device," and insert -- by the mobile device, --.

Signed and Sealed this
Nineteenth Day of February, 2013

Teresa Stanek Rea
*Acting Director of the United States Patent and Trademark Office*